United States Patent [19]

Zach

[11] 4,033,459
[45] July 5, 1977

[54] MODULAR BICYCLE RACK

[76] Inventor: Donald J. Zach, 5824 Glen Flora Drive, Greendale, Wis. 53129

[22] Filed: Sept. 29, 1975

[21] Appl. No.: 617,461

[52] U.S. Cl. .................................. 211/20; 211/22
[51] Int. Cl.² ......................................... B62H 3/00
[58] Field of Search ................... 211/20, 21, 22, 23, 211/24

[56] References Cited

UNITED STATES PATENTS

| 574,689 | 1/1897 | Stover | 211/20 |
| 3,202,289 | 8/1965 | Burditt | 211/22 |
| 3,785,500 | 1/1974 | Kennelly | 211/21 X |

FOREIGN PATENTS OR APPLICATIONS

| 852,332 | 1/1940 | France | 211/22 |
| 26,200 | 3/1932 | Netherlands | 211/20 |
| 82,550 | 3/1956 | Netherlands | 211/22 |
| 456,677 | 11/1936 | United Kingdom | 211/22 |

Primary Examiner—Ramon S. Britts
Assistant Examiner—Robert W. Gibson, Jr.
Attorney, Agent, or Firm—Wheeler, Morsell, House & Fuller

[57] ABSTRACT

A stand for bicycles or other two wheel vehicles includes a base unit with two staggered wheel supporting cradles and a plurality of add-on units. Vertical uprights for each cradle define spaces or slots for the front wheels of two bicycles extending in opposed directions. Each base unit supports four bicycles and each add-on unit, two bicycles. When the base and add-on units are connected the uprights which define the wheel receiving slots are located along two parallel spaced axes. Such an arrangement provides good stability, utilizes a minimum amount of framing material and provides a compact arrangement for closely locating bicycles in a relatively small storage space.

1 Claim, 5 Drawing Figures

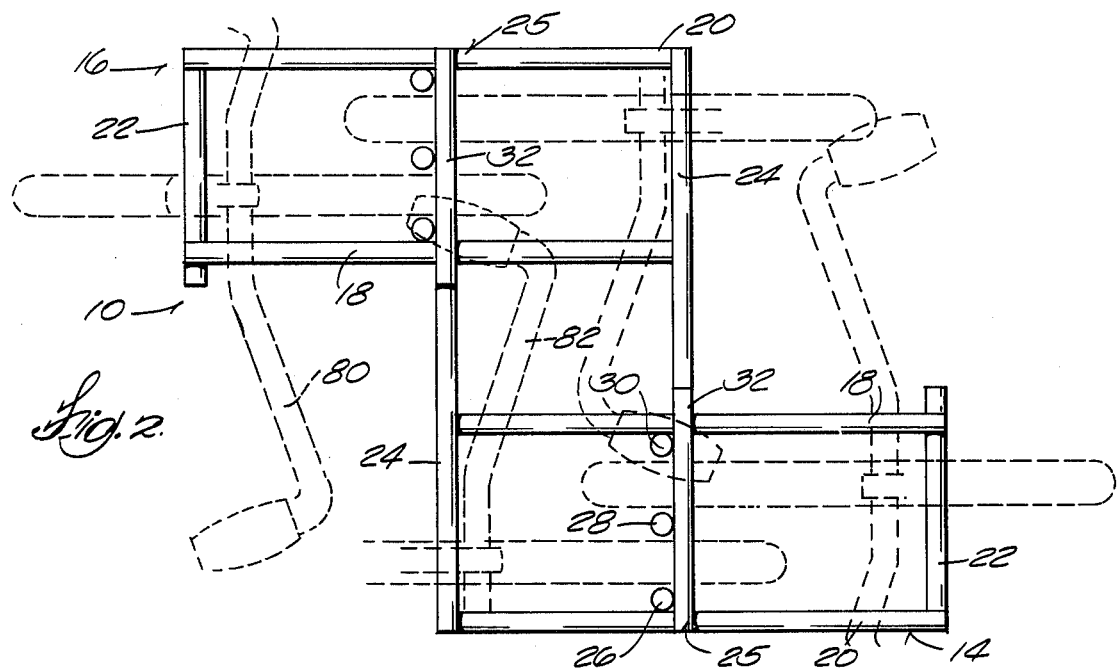
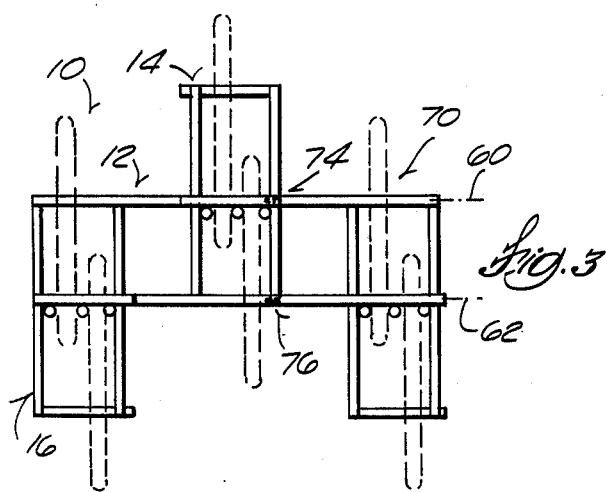
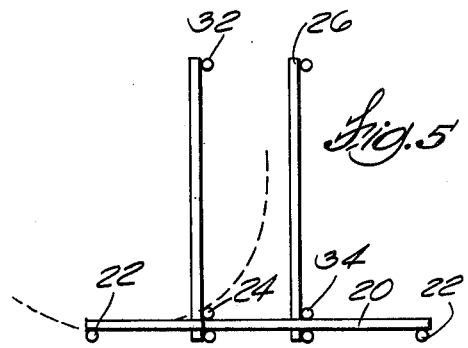
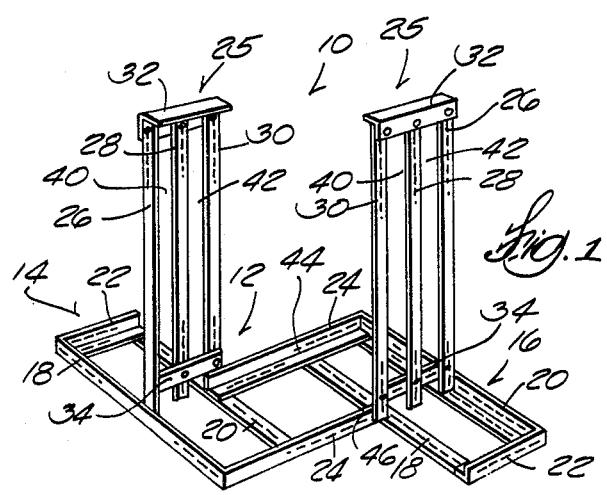
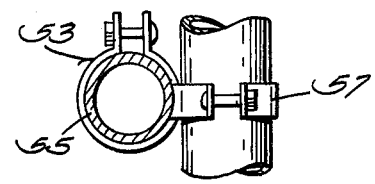

MODULAR BICYCLE RACK

SUMMARY OF INVENTION

The invention provides a modular bicycle rack or stand which is intended to provide maximum storage capability with a minimal amount of storage space. Each base unit has a generally Z-shaped frame with a base formed from two bike-supporting cradles which are connected by extensions on the cross or end runs of the cradle frames. Vertical uprights centered on each cradle define two wheel receiving slots for bikes inserted from opposite directions. The cradles and uprights are spaced to minimize handlebar interference and thus afford compact storage of two bikes on the same side of units. Modular add-on units are assembled by connecting the units so that the vertical uprights are serially arranged and alterantely staggered along two spaced parallel axes.

Further objects, advantages and features of the invention will become apparent from the following disclosure.

DESCRIPTION OF DRAWINGS

FIG. 1 is a perspective view of a single modular bicycle stand unit in accordance with the invention.

FIG. 2 is an enlarged plan view of a modified embodiment of the invention using tubular stock.

FIG. 3 is a diagrammatic plan view in reduced scale of two modular units of the type shown in FIG. 2 connected together.

FIG. 4 is an enlarged view of a connector for use with the tubular frame shown in FIG. 3.

FIG. 5 is an end view of the bicycle stand shown in FIG. 1 on a reduced scale.

Description of Preferred Embodiment

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows a modular base unit 10 which includes a base 12 formed from two base cradle sections 14, 16. Each cradle has two spaced parallel side runs 18, 20 and cross runs or end runs 22, 24.

Each cradle is provided with vertically extending frame portions 25 which include frame sections 26, 28 and 30, which are interconnected at one end by a frame portion 32 and at the bottom by a frame portion 34. Each vertically extending frame section 25 defines two bicycle receiving slots 40, 42. The frames 34 are spaced from the cross runs 22, 24 a suitable distance to provide stable support for a bicycle wheel.

In accordance with the invention, means are provided for connecting and spacing the cradle sections to locate the cradles and the vertically extending frame portions 25 in staggered relationship to afford storage without handlebar interference. In the disclosed construction, the means include extensions 44, 46 on the end runs 24 which extend beyond the cradles for connection to the side runs 18, 20 of the adjacent cradles by bolts, welding, etc. Such a base construction affords adequate stability for the bikes and frame with a minimum amount of material. As disclosed in FIG. 1, perforated strip material and perforated angle iron is employed for the framing.

In FIG. 2, tubular stock is employed for all the framing. The connections between the lengths of tubular stock are made by clamps 53 (FIG. 4) which have two spring clamping portions 55, 57 oriented at right angles.

FIG. 2 also illustrates the staggered and offset relationship of the vertical frame section 25 to eliminate handlebar interference of the handlebars 80, 82 of the stored bikes.

FIG. 3 shows a base unit 10 connected to an add-on unit 70. The ends of the tubing sections 74, 76 on the add-on unit 70 can be reduced in diameter to interfit into the ends of tubes (FIG. 5) 24, 34 on the base unit. The vertical uprights for the base unit and add-on unit are located along two parallel axes 60, 62 with the adjacent uprights staggered. Additional add-on units can be employed if required.

I claim:

1. A modular stand for bicycles each modular unit comprising a base having two cradle sections for receiving and supporting bike wheels, each cradle section including parallel spaced side runs and parallel spaced end runs which define ground engaging rectangular frames and sized to support two bicycle wheels from opposed directions, vertically extending frame portions including a dividing frame portion defining two wheel receiving slots connected to and centered on each of said cradle sections, and means for connecting and spacing said cradle sections and said wheel receiving slots in staggered relationship with the vertically extending frame portions oriented along fixed spaced parallel axes to afford storage of two bikes in each of said cradles from opposite directions without handlebar interference and wherein said connecting means for connecting said cradles comprise extensions on one of the end runs of each cradle which extend beyond said cradle side runs with the end runs having the extensions being connected to the side runs of the adjacent cradle adjacent the vertically extending frame portions.

* * * * *